W. N. OURSLER.
TIRE FILLER.
APPLICATION FILED FEB. 26, 1913.
1,137,888.
Patented May 4, 1915.
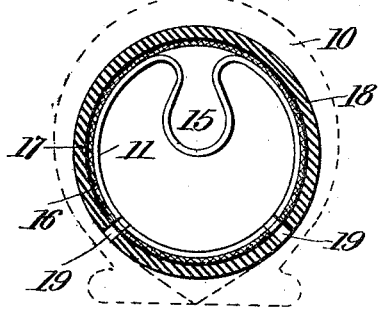
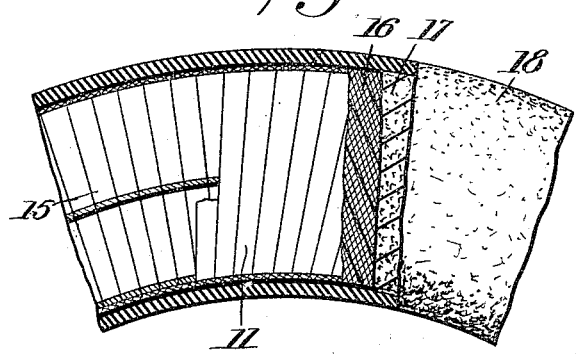
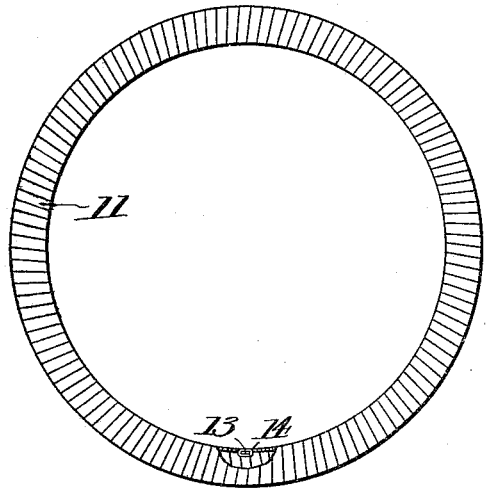
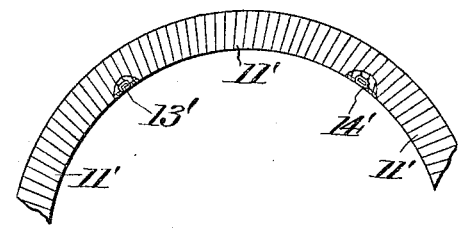
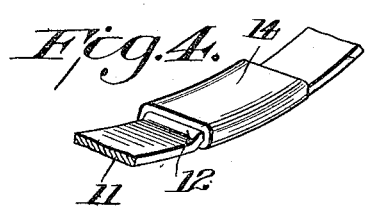
WITNESSES
INVENTOR,
W. N. Oursler,
By
Attorney

UNITED STATES PATENT OFFICE.

WILLIAM N. OURSLER, OF ODEBOLT, IOWA.

TIRE-FILLER.

1,137,888. Specification of Letters Patent. Patented May 4, 1915.

Application filed February 26, 1913. Serial No. 750,904.

*To all whom it may concern:*

Be it known that I, WILLIAM N. OURSLER, a citizen of the United States, residing at Odebolt, in the county of Sac and State of Iowa, have invented certain new and useful Improvements in Tire-Fillers, of which the following is a specification.

My invention relates to tire fillers.

In the use of pneumatic tires for automobiles and other vehicles, there is more or less inconvenience experienced incident to punctured tires and the necessity of taking the casings off the wheels to insert new inner tubes, aside from the inconvenience and labor required to keep the tires properly inflated irrespective of punctures. There is also considerable expense involved in the maintenance of ordinary pneumatic tires incident to wear of both the outer casing or shoe and the inner tube.

My invention, therefore, embodies among other characteristics a filler for the outer shoes or casings of tires which is so constructed and formed as to provide for the requisite resiliency without the necessity of inflation whereby time and inconvenience necessary in the inflation of the common pneumatic tires is obviated.

Another object resides in the provision of an inexpensive, durable, simple and efficient tire filler capable of being readily inserted in a tire shoe or casing and when once inserted the casing may be punctured or worn down to the filler without causing deflation.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a cross sectional view through a tire casing illustrating the application of my filler thereto. Fig. 2 is a fragmentary longitudinal sectional view of the filler. Fig. 3 is a side elevation of the coiled member of the filler. Fig. 4 is a detail fragmentary perspective view illustrating the tongue and socket connection between the ends of the strip material of which the metallic member of the filler is formed or between one section and another. Fig. 5 is a sectional view of a modified form of the metallic member of the filler. Fig. 6 is an enlarged longitudinal section through the tongue and socket connection.

Referring now to the accompanying drawings and more particularly to Figs. 1 to 4, inclusive, and 6, there is shown a tire embodying an outer casing 10 of rubber or fiber or both or any other suitable material of which the usual pneumatic tire casings or shoes are formed. Ordinarily, an inflatable rubber tube is placed and confined within this casing 10. This inflatable tube is subject to puncture and, when punctured, results in a flat tire. To obviate the use of this inflatable inner tube and the consequent danger of deflation incident to puncture and to obviate the time and inconvenience necessary to inflate the same, I have substituted therefor a filler which does not require inflation and which overcomes the possibility of a flat tire incident to puncture. The filler consists preferably of an inner spirally wound metallic member 11 formed preferably of flat strip material which is shouldered adjacent one end, as at 12, to provide a slightly offset tongue 13 adapted to spring into a slightly curved offset socket 14 at the other end of the flat strip material of which the metallic member 11 is formed. The socket 14 is preferably disposed on the inner side of the spirally wound member and the tongue 13 is offset so that when it is inserted in the curved socket 14 the outer contour of the spirally wound member is perfectly smooth and not provided with projections or recesses to cause injury to the outer layers of the filler or to the casing 10. By means of this tongue and socket connection the ends of the flat material of which the spirally wound metallic member is formed are securely locked together against accidental disconnection and whereby the annular contour or shape of the metallic member 11 is not distorted in the use of the filler. By virtue of the curved socket the curved tongue is sprung when inserted thereinto and thereby held by tension against accidental disconnection with relation to the socket.

The edges of the strip material are preferably disposed close together in the formation of the coil or spiral and in the outer or tread surface of the filler there is preferably formed an annular or circumferential depression 15 which is designed to permit the outer casing to adjust itself when that part of the tire comes in contact with the ground and whereby the resiliency of the coiled metallic member 11 is increased.

It is preferred that the inner metallic member 11 be wrapped with a canvas strip or strips 16 preferably of a width substantially the same as the width of the strip material of which the coil is formed. Over the canvas 16 is preferably wound a strip or strips of rubber 17 which are also preferably substantially the same width as the metallic and canvas strips but preferably wound on the metallic member in a direction opposite to the direction of wind of the canvas material. These two or three strips of material, as the case may be, are preferably enveloped in a rubber casing 18 and then the filler is vulcanized.

In Fig. 5 there is shown a modified form of the invention. The only difference, however, between this modified type of invention and that disclosed in Figs. 1 to 4, inclusive, and 6 resides in the formation of the inner metallic member 11' of the filler in sections. In this modified form each section of the metallic member has a curved socket 14' and a tongue 13'. The tongue 13' of one section is adapted to fit in a socket 14' of an adjacent section and so on throughout the filler. The sections may then be wound or covered in the same manner as described with reference to the preferred form of the invention disclosed in Figs. 1 to 4, inclusive. This modified form of invention, it is thought, will be clearly understood by those skilled in the art without further description. In either or both forms, the fillers may be provided with one or more openings 19 arranged along the edges of the rim of the wheel (not shown) to permit the ingress and egress of air for the purpose of keeping the filler supplied with cool air. The hole or holes 19 may extend entirely through the filler and the casing may also have holes therein or the air may enter and escape along the edge of the rim of the wheel. It will thus be seen that I obviate the necessity of inflation from time to time and that punctures do not cause deflation. It is also apparent that blow-outs incident to internal pressure are obviated by the use of my improved filler.

What I claim is:

1. A tire filler composed of a hollow puncture proof member, strips of canvas and rubber wound in opposite directions about said hollow puncture proof member, and a covering vulcanized to said strips.

2. A tire filler composed of a spirally wound resilient member having one end provided with a longitudinally curved socket formed upon the inner side thereof, the opposite end of said spirally wound resilient member being offset forming a shoulder at one side thereof, a resilient tongue extending from said shoulder and disposed inwardly of said spirally wound resilient member, for insertion within the curved socket, the curvature of said socket retaining the ends of the said member in locked relation, said member at the meeting ends thereof having a smooth outer surface and a covering for said spirally wound resilient member.

In testimony whereof I affix my signature in presence of two witnesses.

WILLIAM N. OURSLER.

Witnesses:
W. C. BENNETT,
BRYNTE BRYNTERON.

Copies of this patent may be obtained for five cents each, by addressing the "Commissioner of Patents, Washington, D. C."